United States Patent [19]

Albert

[11] 4,138,080

[45] Feb. 6, 1979

[54] HERMETICALLY SELF SEALING GASKET FOR HIGH VACUUM FASTENERS

[76] Inventor: Karmen D. Albert, 74-16 58th Ave., Elmhurst, N.Y. 11373

[21] Appl. No.: 848,554

[22] Filed: Nov. 4, 1977

Related U.S. Application Data

[63] Continuation-in-part of Ser. No. 696,666, Jun. 16, 1976, Pat. No. 4,058,281.

[51] Int. Cl.[2] .......... F16B 47/00

[52] U.S. Cl. .......... 248/206 R; 248/363; 269/21

[58] Field of Search .......... 248/206 R, 362, 363; 269/21; 294/64 R; 32/3

[56] References Cited

U.S. PATENT DOCUMENTS

| | | | |
|---|---|---|---|
| 3,134,208 | 5/1964 | Richmond | 269/21 X |
| 3,377,096 | 4/1968 | Wood | 248/363 X |
| 3,460,254 | 8/1969 | Sheuer | 248/206 R X |

*Primary Examiner*—Roy D. Frazier

*Assistant Examiner*—Terrell P. Lewis

*Attorney, Agent, or Firm*—Allison C. Collard; Thomas M. Galgano

[57] ABSTRACT

A vacuum-actuated holding device is provided for securing an article having a relatively flat surface against a support having a relatively flat surface and which is capable of maintaining adhesion between the flat surfaces of the article and support for a prolonged period of time by means of an external vacuum source having a needle valve pin. The device has a rubber gasket positionable between the flat surfaces of the article and support in abutting relationship therewith. The gasket has an inner periphery defining a vacuum retaining area and a hermetically self-sealing, radially extending slit formed therethrough in which the needle valve pin of the external vacuum source may be inserted to communicate with the vacuum retaining area and to effect evacuation thereof. The slit is hermetically sealed upon withdrawal of the pin so as to maintain the established vacuum.

15 Claims, 10 Drawing Figures

HERMETICALLY SELF SEALING GASKET FOR HIGH VACUUM FASTENERS

This application is a continuation-in-part of application Ser. No. 696,666 filed June 16, 1976, now U.S. Pat. No. 4,058,281.

This invention relates to a vacuum-actuated holding device. More particularly, it relates to a vacuum-actuated holding device having a hermetically self-sealing, valveless gasket which is capable of securing an article against a flat support surface and is capable of maintaining adhesion to the support for a prolonged period of time by means of an external vacuum source.

In many instances, there is a need for holding devices which can be used to secure articles, such as shelves, appliances, paintings, etc., to a wall or other support, without causing damage to either, and while affording a relatively strong bond. While there are, in the prior art, vacuum holding devices used for such purposes, they have been found to be generally unsatisfactory in they cannot maintain adhesion for prolonged periods of time (i.e., for several months or years). As an example, there are known vacuum holding devices which are used to carry flat sheets of glass and include external handles. These holding devices generally create the necessary vacuum by collapsing a diaphragm against the flat glass surface to evacuate the air within the chamber of the device before the chamber is enlarged with a partial vacuum. These prior art devices are not very satisfactory for long-term securement since they only create a weak partial vacuum which through leakage eventually causes the holding device to be released from the flat surface. As another example, vacuum devices are known which require the continuous operation of a pump vacuum to maintain adhesion. These types of devices are also undesirable both from a practical and economical standpoint.

Accordingly, it is an object of the present invention to provide a novel vacuum-actuated holding device which employs a hermetically self-sealing gasket for securing an article against a support for a prolonged period of time.

It is also an object of the invention to provide such a device which does not require continuous operation of a vacuum pump.

It is a further object of this invention to provide such a vacuum holding device which is simple in design, reliable in operation, and inexpensive in cost.

Certain of the foregoing and related objects are readily-attained in vacuum-actuated holding device for securing an article having a relatively flat suurface against a support having a relatively flat surface, and which is capable of maintaining adhesion between the flat surfaces of the article and support for a prolonged period of time by means of external vacuum source having a needle valve pin. The device includes a rubber gasket positionable between the flat surfaces of the article and support in abutting relationship therewith. The ring has an inner periphery defining a vacuum retaining area and a hermetically self-sealable, radially-extending slit formed therethrough in which the needle valve pin of the external vacuum source may be inserted to communicate with the vacuum retaining area and to effect evacuation thereof. The slit is hermetically sealed upon withdrawl of the pin, which self-sealing is enhanced by the resultant force exerted on the gasket by the article and support as a result of the establishment of a vacuum in the vacuum retaining area.

Preferably, the gasket either has a generally square-shaped or circular cross-section and either a generally circular or oval configuration. Most advantageously, the device may also include a flexible, relatively long needle valve pin to permit use of the device in practically unreachable spaces.

In a preferred embodiment of the invention, the gasket consists of a relatively hard rubber ring having a radially extending-bore formed therethrough and a relatively soft rubber plug sealingly secured in the bore. The plug is provided with a radilly-extending slit formed therethrough for the insertion of a needle valve pin.

In another preferred embodiment, the gasket includes a relatively hard rubber ring and a relatively soft rubber ring. The hard rubber ring is coaxially disposed relative to the soft rubber ring and is secured to the inner periphery of the soft rubber ring. In this case, the slit extends radially through both of the rings. In still another advantageous embodiment of the present invention, the gasket includes a relatively hard rubber ring and a generally ring-shaped, relatively soft rubber sleeve encasing the hard rubber ring; the slit extending radially through both the ring and the sleeve.

Certain of the foregoing related objects are also attained in a vacuum-actuated holding device for securement against a support having a relatively flat face and capable of maintaining adhesion thereto by means of an external vacuum source having a needle valve pin, which includes a block including a relatively flat first surface disposable adjacent to the flat face of the support in opposing relationship, and a second surface to which means may be attached for mounting an article thereon. The device also includes a rubber gasket of the either of the types described above which is positionable between the flat surfaces of the block and support in abutting relationship therewith.

Finally, in the embodiments of the invention in which both hard and soft rubber materials are used, it is preferable that the hard rubber have a durometer hardness of between 70 and 80 and that the soft rubber have a durometer hardness of between 25 and 30.

Other objects and features of the present invention will become apparent from the following detailed description when taken in connection with the accompanying drawings which disclose several embodiments of the invention. It is to be understood that the drawings are designed for the purposes of illustration only, and are not intended as a definition of the limits and scope of the invention disclosed.

In the drawings, wherein similar reference numerals denote similar elements throughout the several views.

Figure 1:
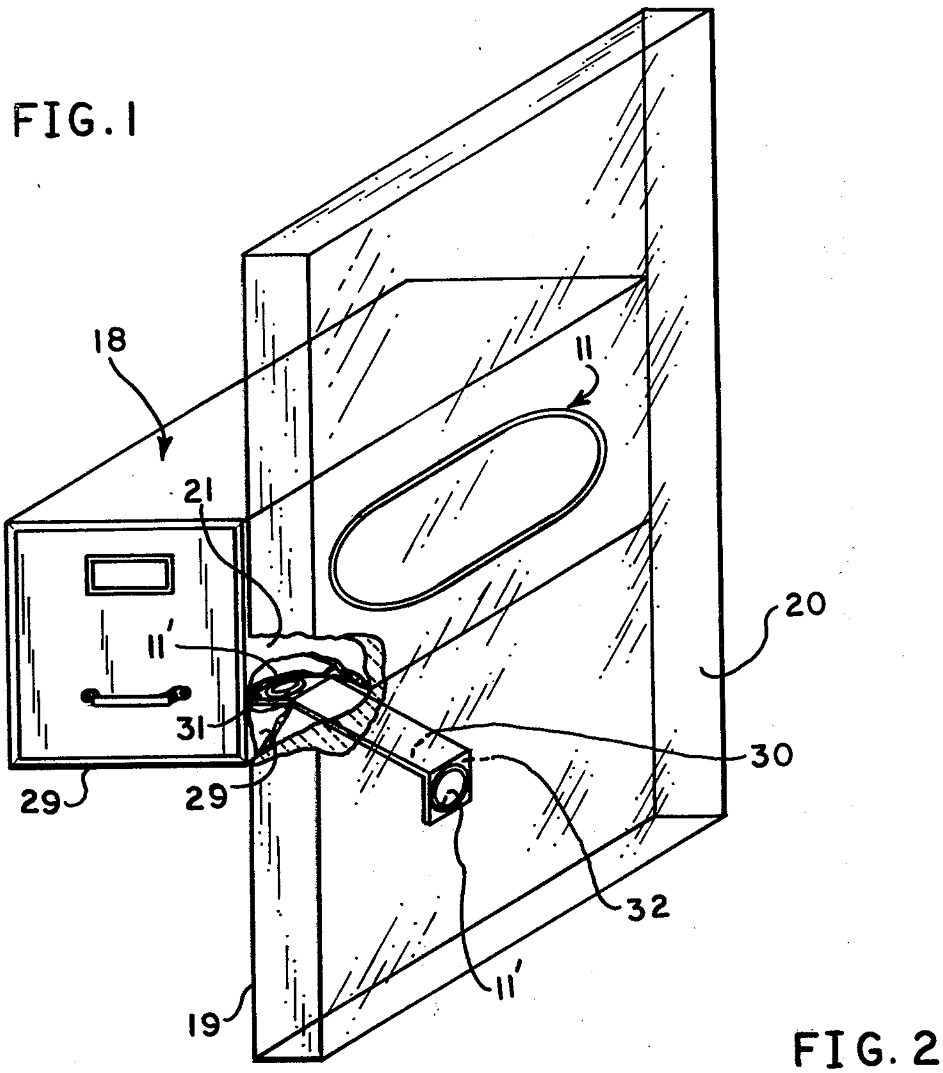
FIG. 1 is a perspective view showing a file cabinet being supported on a vertically-disposed support block by means of gaskets embodying the present invention.
Figure 2:
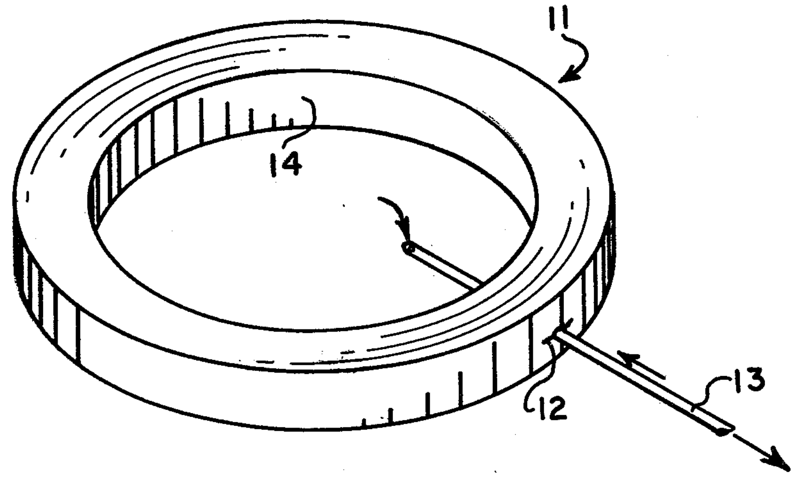
FIG. 2 is a perspective view of one embodiment of the gasket shown in FIG. 1, showing an elongated needle valve pin inserted into a radilly-extending slit formed therein.
Figure 3:
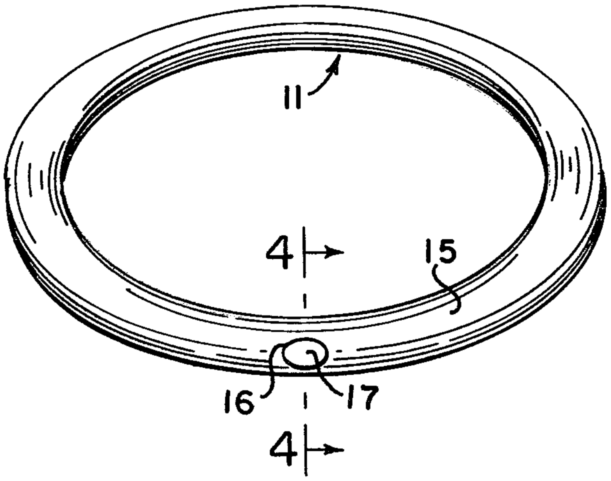
FIG. 3 is a perspective view of another embodiment of the gasket shown in FIG. 1.
Figure 4:
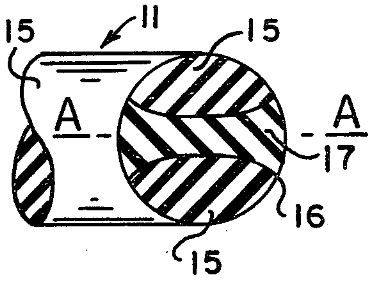
FIG. 4 is an enlarged, fragmentarily-illustrated cross-sectional view, in part elevation, taken along line 4—4 of FIG. 3.

Turning now in detail to the appended drawings, therein illustrated is a novel vacuum-actuated holding device embodying the invention, which includes a rubber gasket or O-ring 11, which as shown in FIG. 1 preferably has either an oval or circular configuration. As can be seen in FIG. 2, gasket 11 has a radially-extending slit 12 formed therethrough, through which an elongated needle valve pin 13 of an external vacuum source (not shown) may be inserted to effect evacuation of the vacuum retaining area defined by the inner periphery 14 of gasket 11 (which will be described in greater detail hereinbelow). Gasket 11 is preferably fabricated from a rubber having a durometer hardness of between about 20 and 25. This insures that, following establishment of a vacuum in the vacuum retaining area (by means of pin 13) and after withdrawal of pin 13, the slit 12 will hermetically seal itself to maintain the established vacuum.

Alternatively, as shown in FIGS. 3–8 gasket 11 may consist of a relatively hard rubber gasket 15 (preferably having a durometer hardness of between about 70 and 80) having a radially-extending bore 16 formed therethrough in which is sealing secured a plug 17 made of a relatively soft rubber. Slit 12 is formed by suitable means, such as a surgical blade (not shown), radially inserted through plug 17 along line A—A shown in FIG. 4. Employment of a hard rubber ring is extremely beneficial since it enhances rigidity to the structure being supported. However, slit 12 cannot be made through the hard rubber since slit 12 would most probably not completely seal itself after withdrawal of pin 13, and consequently, this would eventually cause leakage of the vacuum.

Figure 9:
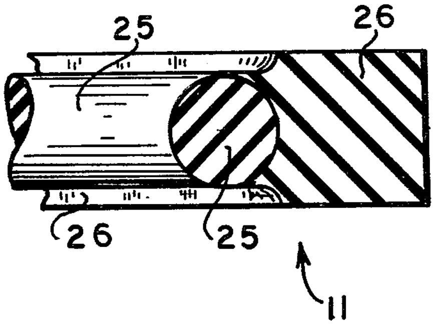
FIG. 9 is a cross-sectional view, in part elevation of a further embodiment of the gasket.
Figure 10:
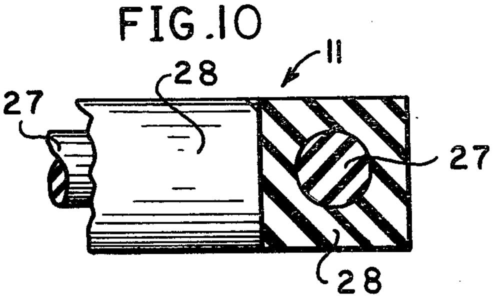
FIG. 10 is a cross-sectional view, in part elevation of still another embodiment of the gasket.

As shown in FIG. 9, in another embodiment of the invention, gasket 11 may consist of two, coaxially-dipsosed rings, a relatively hard rubber inner ring 25 which is secured or molded onto a relatively soft rubber outer ring 26. Alternatively, as shown in FIG. 10, gasket 11 may include ring-shaped core 27 of relatively hard rubber encased in a ring-shaped sleeve 28 of relatively soft rubber. In both cases, slit 12 would extend radially through both the hard and soft rubber gasket components. In both of these examples, as well as in FIGS. 2 and 3, the rings fabricated from hard rubber are illustrated as having a circular cross-section and those fabricated from soft rubber are shown having a square cross-section for purposes of clarity.

Figure 5:
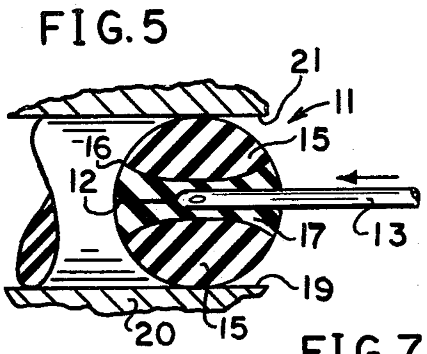
FIG. 5 is a view similar to that of FIG. 4, but showing the gasket disposed between one side of the cabinet and one side of the support block and further showing the partial insertion of a needle valve pin into the slit thereof.
Figure 6:
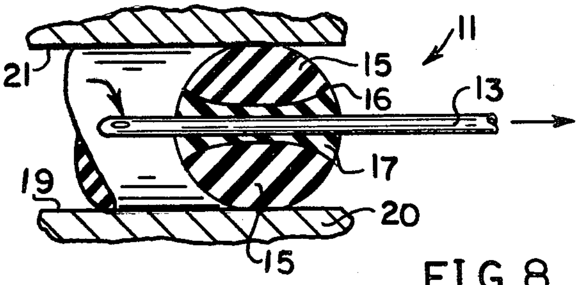
FIG. 6 is a view comparable to FIG. 5, showing full insertion of the needle valve pin and initiation of evacuation.
Figure 7:
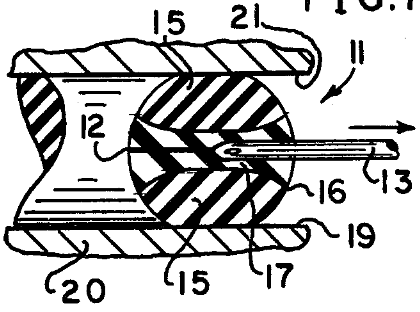
FIG. 7 is a view comparable to FIGS. 5 and 6, showing partial withdrawal of the pin after establishment of a vacuum within the gasket.
Figure 8:
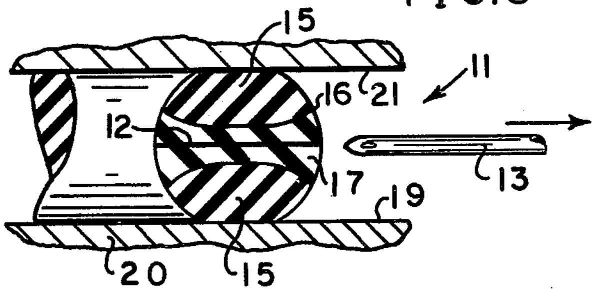
FIG. 8 is a view comparable to FIGS. 5, 6, and 7, showing complete withdrawal of the pin and self-sealing of the slit.

Turning now, in particular to the operation of the device (which is shown sequentially in FIGS. 5–8 with reference to employment of a gasket of the type shown in FIGS. 3 and 4), when it is desired to support an article, such as a file cabinet 18 (see FIG. 1) against a relatively flat wall surface 19 of a support 20 (which, for example, could be a building wall), the generally flat lateral wall 21 of the cabinet is placed against flat wall surface 19 of support 20 with gasket 11 sandwiched therebetween. Then, a relatively long, flexible needle valve pin 13, connected to an external vacuum source, such as a hand-actuated vacuum pump (not shown) would be inserted into a slit 12 formed in plug 17 as shown in FIG. 5. Upon complete insertion of pin 13 into slit 12 (FIG. 6), the vacuum pump will be actuated to evacuate the vacuum retaining area by drawing the air through pin 13, as indicated by the arrows. Upon establishment of a sufficiently high vacuum in the vacuum-retaining area, pin 13 is withdrawn (FIGS. 7 and 8) and slit 11 seals itself as pin 13 is withdrawn, aided by the compressing forces exerted on gasket 11 by the file cabinet 18 and support 20; as can be seen in FIGS. 7 and 8, the upper and lower surfaces will become somewhat flattened due to the compressive forces exerted thereon. However, due to the fact that the gasket is primarily fabricated from a hard rubber, it will afford a more rigid support and minimize shifting of the cabinet relative to the support.

It should be appreciated that a number of gaskets may be employed to enhance support of an article on a support face. For example, as shown in FIG. 1, aside from securing the lateral side 21 of cabinet 18 to wall 19 of support 20, an angle bracket 30 could be used in conjunction with two gaskets 11', 11' to support the bottom wall 29 of cabinet 18. Bracket 30 is provided with an upper bent end portion 31 on which is positioned a relative small gasket 11' and which is then placed against bottom wall 29 of cabinet 18. Similarly, bracket 30 is provided with a lower bent end portion 32 on which is also placed a circular gasket 11' and which is then placed against wall 19 of support 20. The vacuum-retaining area of each gasekt 11' is evacuated in the manner previously described to bond bracket 30 to both bottom wall 29 of cabinet 18 and face 19 of support 20. This will afford a more rigid support for cabinet 18 and will allow greater loads to be supported.

It should also be noted that gasket 11 may be advantageously employed in combination with a support block such as shown in FIG. 1, and with more conventional mounting elements. For example, the block may be provided with a hook fastened to one side thereof for mounting a picture or decoration or other article on the support block. The other side of the block would be placed on a wall surface with a gasket sandwiched therebetween and the gasket vacuum-retaining area would then be evacuated as above described to securely mount the block on the wall. The painting could then be hung on the hook, and as a result of this type of support, no damage to the wall occurs. When it is desired to move or take down the painting, the user simply inserts a needle valve pin into the slit of the gasket to break the vacuum, as a result of which the block will be released from the wall.

It should also be pointed out that it has been found to be particularly advantageous to employ relatively long (approximately 8–14 inches), flexible needle valve pins having an outside diameter of about 1/64 of an inch and an inside bore having a diameter of approximately 20/1000 of an inch. This permits employment of a slit which is extremely small (the slit being somewhat exaggerated in the drawings for the purposes of illustration only), thus enhancing its self-sealing characteristics.

Various types of hard and soft rubbers may also be employed as will be apparent to those skilled in the art. A particularly suitable soft rubber is made by Crane Packing Co., 6400 Oakton Street, Morton Groove, Illinois which is sold under Product No. 0785 (Type 20,000, code 002-0002). Finally, it should also be appreciated that the configuration and cross-sectional shape of the gaskets may be modified to suit the particular articles being supported.

Thus, while only a few embodiments of the present invention have been shown and described, it will be obvious to those persons of ordinary skill in the art that many changes and modifications may be made thereunto without departing from the spirit and scope of the invention.

What is claimed is:

1. A vacuum-actuated holding device for securing an article having a relatively flat surface against a support having a relatively flat surface, and being capable of maintaining adhesion between the flat surfaces of the article and support for a prolonged period of time by means of an external vacuum source having a needle valve pin, comprising:

a rubber gasket positionable between the flat surfaces of the article and support in abutting relationship therewith, said gasket having a generally tubular cross-section defined by a peripheral, continuous outer lateral surface and peripheral, continuous inner lateral surface, the latter of which defines a vacuum retaining area, said gasket also including a hermetically sealable slit formed therethrough extending from said outer lateral surface to said inner lateral surface thereof and in which the needle pin of the external vacuum source be inserted to communicate with said vacuum retaining area, and to effect evacuation thereof, said slit being hermetically sealed upon withdrawal of said pin, aided by the compressing forces exerted on said gasket by the article and support, so as to maintain the vacuum established in said vacuum retaining area.

2. The holding device according to claim 1, wherein said gasket is made from relatively soft rubber having a durometer hardness of between about 25 and 30.

3. The holding device according to claim 1, wherein said gasket comprises a relatively hard rubber ring having a bore formed therethrough extending radially from the longitudinal axis thereof, and a relatively soft rubber plug sealingly secured in said bore, said plug having said slit formed therethrough.

4. The holding device according to claim 3, wherein said hard rubber ring has a durometer hardness of between about 70 and 80 and said soft rubber plug has a durometer hardness of between 25 and 30.

5. The holding device according to claim 1, wherein said gasket includes a relatively hard rubber ring and a relatively soft rubber ring, said hard rubber ring being coaxially disposed relative to said soft rubber ring and being secured to the inner periphery of said soft rubber ring, said slit extending radially through both of said rings.

6. The holding device according to claim 5, wherein said hard rubber ring has a durometer hardness of between about 70 and 80 and said soft rubber ring has a durometer hardness of between 25 and 30.

7. The holding device according to claim 1, wherein said gasket includes a relatively hard rubber ring and a generally ring-shaped relatively soft rubber sleeve encasing said hard rubber ring, said slit extending radially through both said ring and said sleeve.

8. The holding device according to claim 7, wherein said hard rubber ring has a durometer hardness of between about 70 and 80 and said soft rubber ring has a durometer hardness of between 25 and 30.

9. The holding device according to claim 1 additionally including a relatively long, flexible, needle valve pin.

10. The holding device according to claim 1, wherein said gasket has a generally square-shaped cross-section.

11. The holding device according to claim 1, wherein said gasket has a generally circular cross-section.

12. The holding device according to claim 1 wherein said gasket has a generally circular configuration.

13. The holding device according to claim 1, wherein said gasket has a generally oval configuration.

14. A vacuum-actuated holding device for securement against a support having a relatively flat face and capable of maintaining adhesion thereto by means of an external vacuum source having a needle valve pin, comprising:

a block including a relatively flat first surface disposable adjacent to the flat face of said support in opposing relationship thereto, and a second surface to which means may be attached for mounting an article thereon; and a rubber gasket positionable between the flat surface of said block and support in abutting relationship therewith, said gasket having a generally tubular cross-section defined by a peripheral, continuous outer lateral surface and a peripheral, continuous inner lateral surface, the latter of which, defines a vacuum retaining area, said gasket also including a hermetically sealable slit formed therethrough extending from said outer lateral surface to said inner lateral surface thereof and in which the needle pin of the external vacuum source may be inserted to communicate with said vacuum retaining area, and to effect evacuation thereof, said slit being hermetically sealed upon withdrawal of said pin, aided by the compressing forces exerted on said gasket by the article and support, so as to maintain the vacuum established in said vacuum retaining area.

15. The holding device according to claim 14, wherein said gasket is made from relatively soft rubber having a durometer hardness of between about 25 and 30.

* * * * *

UNITED STATES PATENT OFFICE
CERTIFICATE OF CORRECTION

Patent No. 4,138,080 Dated FEB. 6, 1979

Inventor(X) KARMEN D. ALBERT

It is certified that error appears in the above-identified patent and that said Letters Patent are hereby corrected as shown below:

Column 1, line 21, after "in", insert --that--. Column 2, line 11, delete "-" appearing after "extending" and insert "-" before "extending"; Column 2, line 36, delete "of the". Column 3, line 39, delete "sealing" and substitute therefor --sealingly--. Column 4, line 8, delete "a", Column 5, line 28, after "and" insert --a--.

Signed and Sealed this

*Tenth* Day of *July 1979*

[SEAL]

*Attest:*

LUTRELLE F. PARKER

*Attesting Officer* *Acting Commissioner of Patents and Trademarks*